United States Patent
Peterson et al.

(10) Patent No.: US 7,294,679 B2
(45) Date of Patent: Nov. 13, 2007

(54) CATALYST SUPPORT METHOD AND POLYMERIZATION WITH SUPPORTED CATALYSTS

(75) Inventors: Thomas Henry Peterson, Charleston, WV (US); Eric Lucas, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/036,539

(22) Filed: Jan. 14, 2005

(65) Prior Publication Data

US 2005/0159302 A1 Jul. 21, 2005

Related U.S. Application Data

(62) Division of application No. 10/358,951, filed on Feb. 5, 2003, now Pat. No. 6,864,206, which is a division of application No. 09/731,002, filed on Dec. 6, 2000, now Pat. No. 6,555,495.

(51) Int. Cl.
*C08F 4/44* (2006.01)
(52) U.S. Cl. ............ 526/129; 526/161; 526/171; 502/104; 502/117; 502/155; 502/167
(58) Field of Classification Search ................. 526/129, 526/161, 171; 502/104, 117, 155, 167
See application file for complete search history.

(56) References Cited

U.S. PATENT DOCUMENTS

| 5,057,475 | A | 10/1991 | Canich et al. ............ 502/104 |
| 5,086,025 | A | 2/1992 | Chang ..................... 502/117 |
| 5,612,271 | A * | 3/1997 | Zandona ................... 502/117 |
| 5,654,454 | A | 8/1997 | Peifer et al. ................ 556/11 |
| 5,691,264 | A | 11/1997 | Sacchetti et al. .......... 502/129 |
| 6,211,311 | B1 | 4/2001 | Wang et al. ............... 526/131 |
| 6,255,419 | B1 * | 7/2001 | Imuta et al. ............... 526/172 |
| 6,271,325 | B1 * | 8/2001 | McConville et al. ...... 526/217 |
| 6,555,495 | B2 | 4/2003 | Peterson et al. .......... 502/117 |
| 6,812,303 | B1 | 11/2004 | Matsushita et al. ........ 526/133 |

FOREIGN PATENT DOCUMENTS

| EP | 0500944 A1 | 9/1992 |
| EP | 0511665 A2 | 11/1992 |
| EP | 0573120 A1 | 12/1993 |
| EP | 0890581 A1 | 1/1999 |
| WO | WO99/12981 | 3/1999 |

OTHER PUBLICATIONS

JP 05-331227 (Abstract), pub. Dec. 14, 1993.
JP 10-245418 (Abstract), pub. Sep. 14, 1998.
JP 10-204122 (Abstract), pub. Aug. 04, 1998.
JP 11-199612 (Abstract, pub. Jul. 27, 1999.
JP 2000-198812 (Abstract), pub. Jul. 18,2000.

* cited by examiner

*Primary Examiner*—Robert D. Harlan
(74) *Attorney, Agent, or Firm*—Kevin M. Faulkner; Leandro Arechederra, III

(57) ABSTRACT

This invention relates to a method to support one or more catalyst compounds comprising contacting the catalyst compounds with a pretreatment agent comprising an aluminum alkyl and or an alumoxane in solution and thereafter contacting the combination with a supported activator.

5 Claims, 1 Drawing Sheet

CATALYST SUPPORT METHOD AND POLYMERIZATION WITH SUPPORTED CATALYSTS

RELATED APPLICATION DATA

The present application is a divisional of and claims priority to U.S. Ser. No. 10/358,951, filed Feb. 5, 2003, now issued as U.S. Pat. No. 6,864,206 B2, which is a divisional of and claims priority to U.S. Ser. No. 09/731,002, filed Dec. 6, 2000, now issued as U.S. Pat. No. 6,555,495 and is herein incorporated by reference.

FIELD OF THE INVENTION

The present invention relates to a method to support catalyst compounds and/or improve catalyst activity and a polymerization process using these supported compounds to produce polyolefins. Preferably, one or more catalyst compounds are contacted with an aluminum alkyl and or an alumoxane in solution, and thereafter are contacted with a supported activator.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization (solution, slurry, high pressure or gas phase) for producing a particular polymer has been greatly expanded. Also, advances in polymerization technology have provided more efficient, highly productive and economically enhanced processes. The use of inorganic supports for catalysts has long been the standard practice for commercial gas- and slurry-phase polyolefin production. While in some cases, the interaction of the inorganic support with the catalytic metal may play a beneficial role in defining the catalytic properties of the system, a primary motive for use of inorganic supports is the morphological control they impart to the growing polymer particles. As a result, preferred methods for delivery of catalysts to commercial reactors involve the conveyance of the catalyst in some solid form, either as a dry powder or mineral oil slurry.

Though inorganic-supported catalysts, particularly silica-supported catalysts, have much to offer regarding simplicity of catalyst production and particle size control in commercial operation, the use of conventional supporting materials carry several disadvantages as well. First and foremost, many catalysts experience significant activity losses when they come in contact with silica supports. Several explanations have been provided for this observation and include irreversible catalyst decomposition by reaction with chemical functionality on the support and catalyst inhibition by Lewis basic coordination of surface functionality in competition with monomer coordination. Full-sandwich (metallocene) catalysts appear the least affected by interaction with support materials and moderate activity losses are suffered when the mode of catalyst delivery is changed from liquid to solid-supported. In contrast, half-sandwich (monocylopentadienyl) catalysts and non-metallocene catalysts can become completely inactive when exposed to silica materials and early strategies aimed toward commercialization of these catalysts focussed exclusively on solution delivery technologies.

Thus, there is a desire in the industry using this technology to reduce the complexity of the process, to improve the process operability, to increase product characteristics or to vary catalyst choices, i.e. by providing means to place half-sandwich (monocylopentadienyl) catalysts and non-metallocene catalysts on a silica support without losing catalytic ability. Thus, it would be advantageous to have a process that is capable of improving one or more of these industry needs.

SUMMARY OF THE INVENTION

This invention relates to a method to support one or more catalyst compounds comprising contacting the catalyst compounds with an aluminum alkyl or organoaluminum compound, and or an alumoxane in solution and thereafter contacting the combination with a supported activator. The aluminum alkyl may be represented by the formula $Al(R)_3$, where each R group is independently a $C_1$ to $C_{40}$ alkyl group. The alumoxane may be any alumoxane or modified alumoxane as described in the activator section below. The supported activator is any activator as described below that has been deposited on, contacted with, vaporized with, bonded to, or incorporated within, adsorbed or absorbed in, or on, an inert particulate, a support or carrier. Support materials of the invention include inorganic or organic support materials, preferably a porous support material.

DETAILED DESCRIPTION OF THE INVENTION

Figure 1B:
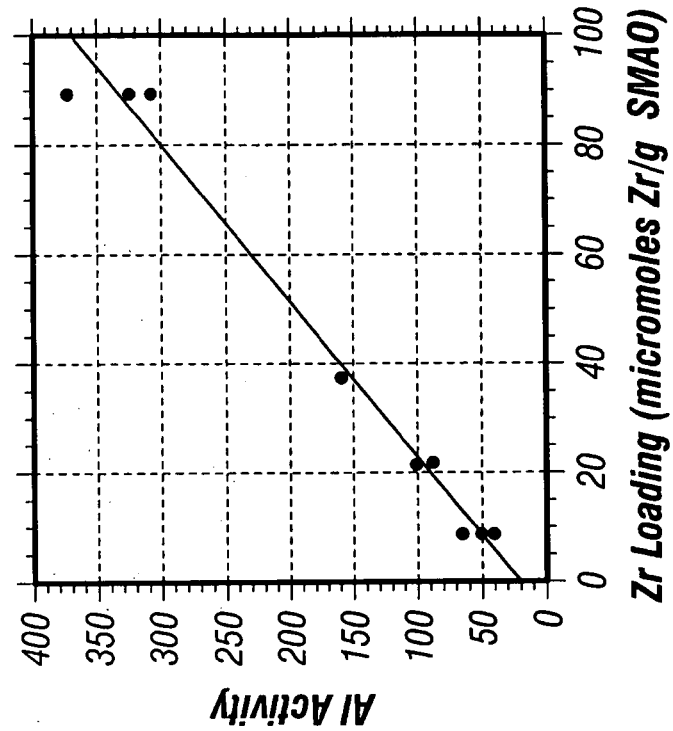
FIG. 1 is a graph of aluminum activity versus Al:Zr ratio and a graph of zirconium activity versus Al:Zr ratio.
Figure 1A:
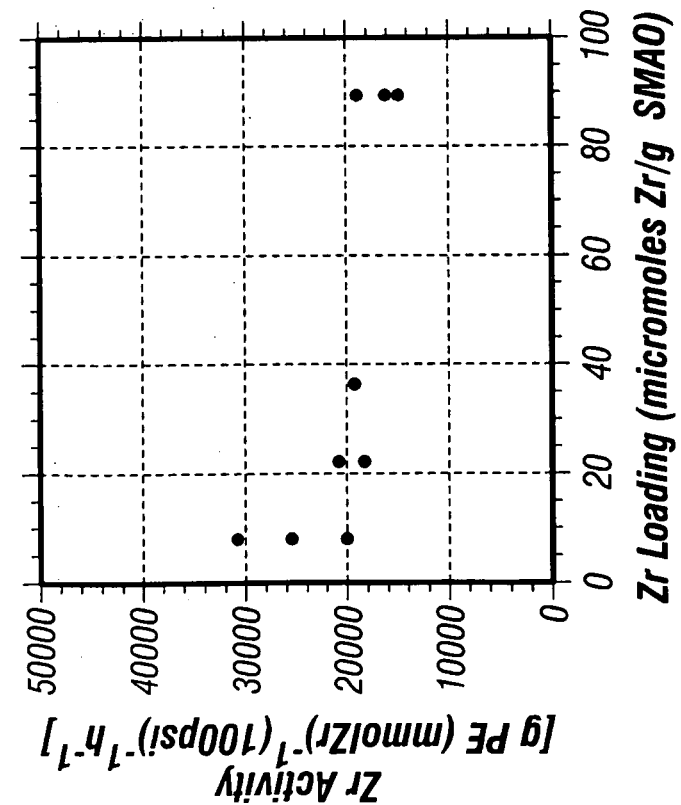

This invention relates to a method to support one or more catalyst compounds comprising contacting the catalyst compounds with a pretreatment agent selected from the group consisting from aluminum alkyls and or alumoxanes and mixtures thereof in solution and thereafter contacting the combination with a supported activator. The aluminum alkyl may be represented by the formula $Al(R)_3$, where each R group is independently a $C_1$ to $C_{40}$ alkyl group, preferably a $C_1$ to $C_{12}$ alkyl group, more preferably a $C_1$ to $C_8$ alkyl. Preferred alkyl groups include: methyl, ethyl, propyl, isopropyl, butyl, isobutyl cyclobutyl, pentyl, cyclopentyl, hexyl, isohexyl, cyclohexyl and the like. The alumoxane may be any alumoxane or modified alumoxane as described in the activator section below. Preferred alumoxanes may be represented by the formula R—Al—O, where R is a $C_1$ to $C_{40}$ alkyl group, preferably a $C_1$ to $C_{12}$ alkyl group, more preferably a $C_1$ to $C_8$ alkyl. Preferred alkyl groups include: methyl, ethyl, propyl, isopropyl, butyl, isobutyl, cyclobutyl, pentyl, cyclopentyl, hexyl, isohexyl, cyclohexyl and the like. Particularly preferred alumoxane include modified alumoxanes, such as modified methyl alumoxane. Preferred aluminum alkyls or alumoxanes include methyl alumoxane, modified methyl alumoxane, triisobutyl aluminum, tri-n-octylaluminum, tri-noctylalumoxane, isobutylalumoxane, and combinations thereof.

Preferred activators include those described in the activator section below. The supported activator is any activator described below that has been deposited on, contacted with, vaporized with, bonded to, or incorporated within, adsorbed or absorbed in, or on, an inert particulate, a support or carrier. Support materials of the invention include inorganic or organic support materials, preferably a porous support material.

The catalyst system may be prepared by combining the pretreatment agent (aluminum alkyl and or alumoxane) in any suitable solvent such as an alkane, toluene, xylene, etc., with one or more catalyst compounds. The solvent may first be purified in order to remove any poisons, which may affect the catalyst activity, including any trace water and/or oxygenated compounds. Purification of the solvent may be accomplished by using activated alumina and activated supported copper catalyst. The combination of catalyst compound and the pretreatment agent are preferably contacted for at least 0.1 minutes, preferably between 0.1 and 10,000 minutes, more preferably between 1 and 1440 minutes, even more preferably 5 and 240 minutes. Then the combination is contacted with a supported activator. The pretreatment agent is preferably present at a ratio of 10,000:1 to 0.5:1 of the metal of the pretreatment agent to the metal of the catalyst compound, more preferably at 1,000:1 to 1:1, more preferably 500:1 to 10:1, more preferably 400:1 to 20:1, more preferably 300:1 to 30:1. The supported activator is generally added to the combination as a solution, slurry (in mineral oil for example) or powder. The mixture of the combination and the supported activator is preferably contacted for at least 1 minute, preferably between 1 and 10,000 minutes, more preferably between 5 and 1200 minutes, even more preferably between 10 and 1500 minutes. The supported activator is preferably present at a ratio of 10,000:1 to 0.5:1 of the metal of the supported activator to the metal of the catalyst compound, more preferably at 5000:1 to 1:1, more preferably 1000:1 to 10:1, more preferably 800:1 to 20:1, more preferably 600:1 to 30:1. The mixture may be dried (including by heat or vacuum to remove the liquids,) to form a powder or may remain a slurry. If dried to powder state, the powder is preferably free flowing. The powder may then be introduced into the reactor or combined with a liquid (such as hexane, isopentane or other hydrocarbon) to form a slurry that is introduced into the reactor.

Preferably the catalyst compound is combined on-line with an aluminum alkyl and or an alumoxane and thereafter is combined on-line with a slurry or solution comprising a supported activator.

One of the benefits of utilizing the instant invention is that catalyst costs can be optimized and or significantly reduced. We have found that with the pre-treatment described herein that the activity of a catalyst system can be greatly enhanced. Thus, for example, in a typical polymerization system using a zirconium based catalyst compound (such as indenyl zirconium tris pivalate) and a supported methylalumoxane activator one typically must have a high aluminum to zirconium ratio to get commercially acceptable production rates and/or catalyst activities. In the instant invention, we have found that lower aluminum to zirconium ratios can be used and yet the same or better catalyst activities and or production rates can be obtained when the pre-treatment step is used. In fact typically Al:Zr ratios in an indenyl zirconium tris pivalate/supported methylalumoxane system can be as high as 500:1, while the instant invention has good activity at 30:1 when the indenyl zirconium tris pivalate is treated with modified methyl alumoxane prior to combination with the supported methylalumoxane.

Catalyst Compounds

Catalyst compounds that may be used in the practice of this invention include:

a) Group 15 containing metal compounds (as described below);
b) Phenoxide catalyst compounds (as described below); and
c) Half-Sandwich Bulky ligand metallocene compounds (as described below).

Group 15 Containing Metal Compound

The mixed catalyst composition of the present invention includes a Group 15 containing metal compound. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In a preferred embodiment, the Group 15 containing metal compound of the present invention may be represented by the formulae:

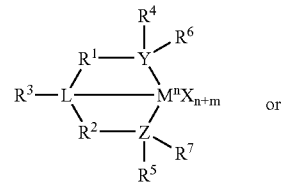

Formula I

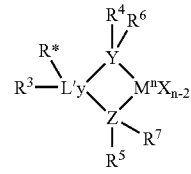

Formula II wherein

M is a Group 3 to 12 transition metal or a Group 13 or 14 main group metal, preferably a Group 4, 5, or 6 metal, and more preferably a Group 4 metal, and most preferably zirconium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, −1, −2 or −3, and more preferably −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and $R^*$ is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

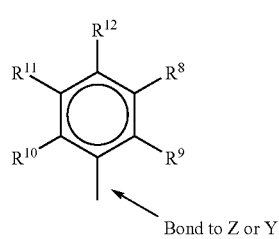

Formula 1 wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

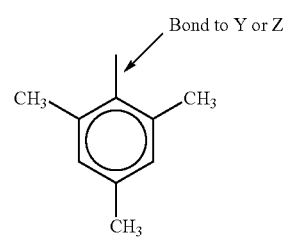

Formula 2

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In a particularly preferred embodiment the Group 15 containing metal compound is represented by the formula:

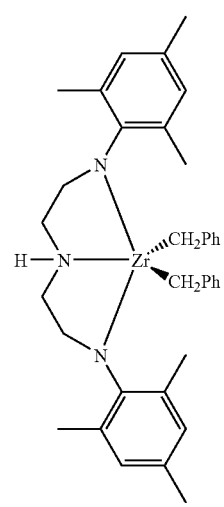

Compound I

In compound I, Ph equals phenyl.

The Group 15 containing metal compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

A preferred direct synthesis of these compounds comprises reacting the neutral ligand, (see for example YZL or YZL') with $M''X_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL') with a compound represented by the formula $M''X_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

In a preferred embodiment when the catalyst compound is a Group 15 metal containing compound, the treating agent preferably comprises an alumoxane and or modified alumoxane. In another preferred embodiment, when the catalyst compound is a Group 15 metal containing compound, the pretreatment agent preferably comprises less than 5 weight % of aluminum alkyl, preferably less than 1 weight %, more preferably less than 0.5 weight %, based upon the weight of the solution.

Phenoxide Catalyst Compounds

Another group of metal catalyst compounds that may be used in the process of this invention include one or more catalysts represented by the following formulae:

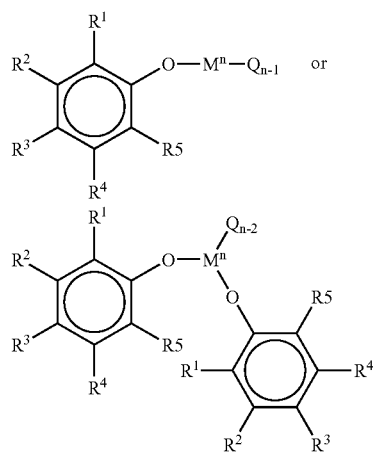

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$. A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment, Q is a bond to any of $R^2$ to $R^5$ and the R group that Q is bound to is a heteroatom containing group.

These phenoxide catalysts may be activated with activators including alkyl aluminum compounds (such as diethylaluminum chloride), alumoxanes, modified alumoxanes, non-coordinating anions, non-coordinating group 13 metal or metalliod anions, boranes, borates and the like. For further information on activators please see the Activator and Activation Methods for the Metal Catalyst Compounds section herein.

This invention may also be practiced with the catalysts disclosed in EP 0 874 005 A1, which in incorporated by reference herein.

In a preferred embodiment the phenoxide catalyst compound comprises one or more of:
bis(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zirconium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;

bis(N-benzyl-3,5-di-t-butylsalicylimino)titanium(IV) dipivalate;
bis(N-benzyl-3,5-di-t-butylsalicylimino)zirconium(IV) di(bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethylbenzyl)salicylimino) zirconium(IV) dibenzyl;
bis(N-iso-propyl-3,5-di-(1',1'-dimethylbenzyl)salicylimino) titanium(IV) dibenzyl;
bis(N-iso-propyl-3,5-di-(1',1'-dimethylbenzyl)salicylimino) hafnium(IV) dibenzyl;
bis(N-iso-butyl-3,5-di-(1',1'-dimethylbenzyl)salicylimino) zirconium(IV) dibenzyl;
bis(N-iso-butyl-3,5-di-(1',1'-dimethylbenzyl)salicylimino) zirconium(IV) dichloride;
bis(N-hexyl-3,5-di-(1',1'-dimethylbenzyl)salicylimino)zirconium(IV) dibenzyl;
bis(N-phenyl-3,5-di-(1',1'-dimethylbenzyl)salicylimino)zirconium(IV) dibenzyl;
bis(N-iso-propyl-3,5-di-(1'-methylcyclohexyl)lsalicylimino)zirconium(IV) dibenzyl;
bis(N-benzyl-3-t-butylsalicylimino)zirconium(IV) dibenzyl;
bis(N-benzyl-3-triphenylmethylsalicylimino)zirconium(IV) dibenzyl;
bis(N-iso-propyl-3,5-di-trimethylsilylsalicylimino)zirconium(IV) dibenzyl;
bis(N-iso-propyl-3-(phenyl)salicylimino)zirconium(IV) dibenzyl;
bis(N-benzyl-3-(2',6'-di-iso-propylphenyl)salicylimino)zirconium(IV) dibenzyl;
bis(N-benzyl-3-(2',6α-di-phenylphenyl)salicylimino)zirconium(IV) dibenzyl;
bis(N-benzyl-3-t-butyl-5-methoxysalicylimino)zirconium (IV) dibenzyl;
bis(2-(2H-benzotriazol-2-yl)-4,6-di-t-amylphenoxide)zirconium(IV) dibenzyl;
bis(2-(2H-benzotriazol-2-yl)-4,6-di-t-amylphenoxide)zirconium(IV) dichloride;
bis(2-(2H-benzotriazol-2-yl)-4,6-di-t-amylphenoxide)zirconium(IV) di(bis(dimethylamide));
bis(2-(2H-benzotriazol-2-yl)-4,6-di-(1',1'-dimethylbenzyl) phenoxide)zirconium(IV) dibenzyl;
bis(2-(2H-benzotriazol-2-yl)-4,6-di-t-amylphenoxide)titanium(IV) dibenzyl;
bis(2-(2H-benzotriazol-2-yl)-4,6-di-(1',1'-dimethylbenzyl) phenoxide)titanium(IV) dibenzyl;
bis(2-(2H-benzotriazol-2-yl)-4,6-di-(1',1'-dimethylbenzyl) phenoxide)titanium(IV) dichloride;
bis(2-(2H-benzotriazol-2-yl)-4,6-di-(1',1'-dimethylbenzyl) phenoxide)hafnium(IV) dibenzyl;
(N-phenyl-3,5-di-(1',1'-dimethylbenzyl)salicylimino)zirconium(IV) tribenzyl;
(N-(2',6'-di-iso-propylphenyl)-3,5-di-(1',1'-dimethylbenzyl) salicylimino)zirconium(IV) tribenzyl;
(N-(2',6'-di-iso-propylphenyl)-3,5-di-(1',1'-dimethylbenzyl) salicylimino)titanium(IV) tribenzyl; and
(N-(2',6'-di-iso-propylphenyl)-3,5-di-(1',1'-dimethylbenzyl) salicylimino)zirconium(IV) trichloride.

Half-Sandwich Bulky Ligand Metallocene Compound

Generally, bulky ligand metallocene compounds have a bulky ligand bonded to at least one metal atom. Typical bulky ligand metallocene compounds are generally described as containing one bulky ligand(s) and one or more leaving group(s) bonded to at least one metal atom. In one preferred embodiment, a bulky ligands is η-bonded to the metal atom, most preferably $\eta^5$-bonded to the metal atom.

The bulky ligands are generally represented by one or more open, acyclic, or fused ring(s) or ring system(s) or a combination thereof These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference. Preferably, the bulky ligand metallocene catalyst compound is represented by the formula:

$$L^C AJMQ_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$, J is a heteroatom ancillary ligand; and A is a bridging group; Q is a univalent anionic ligand; and n is the integer 0,1 or 2. In formula (V) above, $L^C$, A and J may form a fused ring system.

The bulky ligand, $L^C$, is a open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^C$ may be any other ligand structure capable of η-bonding to M, preferably $\eta^3$-bonding to M and most preferably $\eta^5$-bonding. In yet another embodiment, the atomic molecular weight (MW) of $L^C$ exceeds 60 a.m.u., preferably greater than 65 a.m.u. In another embodiment, $L^C$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^C$ bulky ligands include but are not limited to bulky amides, phosphides, alkoxides, aryloxides, imides, carbolides, borollides, porphyrins, phthalocyanines, corrins and other polyazomacrocycles.

$L^C$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Q is a monoanionic labile ligand having a sigma-bond to M. Depending on the oxidation state of the metal, the value for n is 0, 1 or 2.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, triflurormethyl, tetramethylene, pentamethylene, methylidene, methyoxy, ethyoxy, propoxy, phenoxy, bis(N-methylanilide), dimethylamide, dimethylphosphide radicals and the like.

A is a bridging group. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233,049, 5,744,417, and 5,856,258 all of which are herein incorporated by reference.

In one embodiment, the bulky ligand metallocene catalyst compounds those complexes known as transition metal catalysts based on bidentate ligands containing pyridine or quinoline moieties, such as those described in U.S. application Ser. No. 09/103,620 filed Jun. 23, 1998, which is herein incorporated by reference.

In one embodiment, useful catalyst compounds are represented by the formula:

$$((Z)XA_t(YJ))_qMQ_n \qquad (VII)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

In another embodiment, the bulky ligand metallocene catalyst compounds are those described in PCT publications WO 99/01481 and WO 98/42664, which are fully incorporated herein by reference.

In a preferred embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In a particularly preferred embodiment, the other metal compound or second metal compound is the bulky ligand metallocene catalyst compound is represented by the formula:

$$L^D MQ_2(YZ)X_n \qquad (VI)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; Q is a univalent anionic ligand also bonded to M; X is a univalent anionic group when n is 2 or X is a divalent anionic group when n is 1; n is 1 or 2.

In formula (VI), $L^D$ and Q are as defined above for formula (V). Preferably Q is selected from the group consisting of —O—, —NR—, —CR$_2$— and —S—; Y is either C or S; is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Preferred catalyst compounds include, but are not limited to: indenyl zirconium tris(diethylcarbamate),
indenyl zirconium tris(pivalate),
indenyl zirconium tris(p-toluate),
indenyl zirconium tris(benzoate), (1-methylindenyl) zirconium tris(pivalate),
(2-methylindenyl) zirconium tris(diethylcarbamate),
(methylcyclopentadienyl) zirconium tris(pivalate),
cyclopentadienyl tris(pivalate), and
(pentamethylcyclopentadienyl) zirconium tris(benzoate).

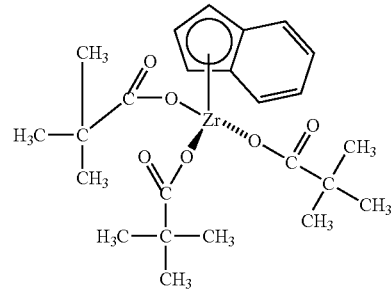

Activator and Activation Methods

The catalyst compounds described above are preferably combined with one or more activators to form a catalyst system.

For the purposes of this patent specification and appended claims, the term "activator" is defined to be any compound or component or method which can activate any of the Group 15 containing metal compounds, the phenoxide compounds and/or the bulky ligand metallocene catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene catalyst compound or Group 15 containing metal compound to a catalytically active Group 15 containing metal compound or bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene catalyst and/or the Group 15 containing metal compound.

In one embodiment, an activation method using ionizing ionic compounds not containing an active proton but capable of producing a Group 15 containing metal compound cation or bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include trimethylaluminum, triethylaluminurn, truisobutylaluminurn, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a bulky ligand metallocene catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane) benzimidazolide), which are herein incorporated by reference.

It is also within the scope of this invention that the above described Group 15 containing metal compounds and bulky ligand metallocene catalyst compounds can be combined with one or more of the catalyst compounds represented by formulas (III) through (VI) with one or more activators or activation methods described above.

It is also contemplated that any one of the bulky ligand metallocene catalyst compounds of the invention have at least one fluoride or fluorine containing leaving group as described in U.S. application Ser. No. 09/191,916 filed Nov. 13, 1998.

In a preferred embodiment alumoxane may be MMAO3A (modified methyl alumoxane in heptane, commercially available from Akzo Chemicals, Inc., Holland, under the trade name Modified Methylalumoxane type 3A, see for example those alumoxanes disclosed in U.S. Pat. No. 5,041, 584, which is herein incorporated by reference).

Preferred activators may be represented by the following general formula:

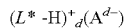

wherein: L* is a neutral Lewis base; (L*-H)$^+$ is a Bronsted acid; A$^{d-}$ is a noncoordinating, compatible anion having a charge of d–, and d is an integer from 1 to 3. More preferably A$^{d-}$ corresponds to the formula: $(M^{k+}Q_n)^{d-}$, wherein: k is an integer from 1 to 3; n is an integer from 2 to 6; n–k=d; M' is an element selected from Group 13 of the Periodic Table of the Elements; and Q independently each occurrence is selected from hydride, dialkylamido, halide, alkoxide, aryloxide, hydrocarbyl, and halosubstituted-hydrocarbyl radicals, said Q having up to 20 carbons with the proviso that in not more than one occurrence is Q halide.

In a more preferred embodiment, d is one, i.e. the counter ion has a single negative charge and corresponds to the formula A$^-$. Activators comprising boron which are particularly useful in the preparation of catalysts of this invention may be represented by the following general formula: (L*-H)$^+$ (BQ'$_4$)$^-$ wherein: L* is as previously defined; B is boron in an oxidation state of 3; and Q' is a fluorinated C$_{1-20}$ hydrocarbyl group. Most preferably, Q' is in each occurrence a fluorinated aryl group, especially a pentafluorophenyl group.

Illustrative, but not limiting examples of boron compounds which may be used as an activating cocatalyst in the preparation of the improved catalysts of this invention are tri-substituted ammonium salts such as:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis(pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate, and
N,N-dimethyl-(2,4,6-trimethylanilinium)tetrakis-(2,3,4,6-tetrafluorophenyl) borate;
dialkyl ammonium salts such as: di-(i-propyl)ammonium tetrakis(pentafluorophenyl) borate, and dicyclohexylammonium tetrakis(pentafluorophenyl) borate; and
tri-substituted phosphonium salts such as: triphenylphosphonium tetrakis(pentafluorophenyl) borate, tri(o-tolyl) phosphonium tetrakis(pentafluorophenyl) borate, and tri (2,6-dimethylphenyl)phosphonium tetrakis (pentafluorophenyl) borate.

Preferred [L*-H]+ cations are N,N-dimethyl-anilinium and tributylammonium.

Another suitable ion forming, activating cocatalyst comprises a salt of a cationic oxidizing agent and a noncoordinating, compatible anion represented by the formula:

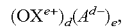

wherein:

$OX^{e+}$ is a cationic oxidizing agent having a charge of e+; e is an integer from 1 to 3; and $A^-$, and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

Another suitable ion forming, activator comprises a compound which is a salt of a carbenium ion and a noncoordinating, compatible anion represented by the formula: $(C)^+ A^-$, wherein: $(C)^+$ is a $C_{1-20}$ carbenium ion; and $A^-$ is as previously defined. A preferred carbenium ion is the trityl cation, i.e. triphenylcarbenium.

The foregoing activating technique and ion forming activators are also preferably used in combination with a tri(hydrocarbyl)aluminum compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

Supports, Carriers and General Supporting Techniques

The above described catalyst compounds, activators and/or catalyst systems may be combined with one or more support materials or carriers.

For example, in a most preferred embodiment, the activator is contacted with a support to form a supported activator wherein the activator is deposited on, contacted with, vaporized with, bonded to, or incorporated within, adsorbed or absorbed in, or on, a support or carrier. Support materials of the invention include inorganic or organic support materials, preferably a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (EP-B1 0 511 665), phyllosilicate, zeolites, talc, clays U.S. Pat. No. (6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Another preferred support is a fumed silica sold under the trade name of Gasil™ by Crosfield Corporation in Joliet, Ill. Fumed silica is typically a silica with particles 7 to 30 nanometers in size that has been treated with an agent such as dimethylsilyldichloride such that a majority of the surface hydroxyl groups are capped.

It is preferred that the support material, most preferably an inorganic oxide, has a surface area in the range of from about 10 to about 1000 $m^2/g$, a pore volume in the range of from about 0.1 to about 5.0 cc/g and an average particle size in the range of from about 5 to about 500 μm. More preferably, the surface area of the support is in the range of from about 50 to about 700 $m^2/g$, pore volume of from about 0.5 to about 4 cc/g and average particle size of from about 10 to about 200 μm. Most preferably the surface area of the support is in the range from about 100 to about 500 $m^2/g$, pore volume from about 0.8 to about 3.5 cc/g and average particle size is from about 15 to about 100 μm. The average pore size of the support material of the invention typically has pore size in the range of from 10 to 1000 Å, preferably 50 to about 500 Å, and most preferably 75 to about 450 Å.

There are various methods known in the art for producing a supported activator or combining an activator with a support material. In an embodiment, the support material is chemically treated and/or dehydrated prior to combining with the catalyst compound, activator and/or catalyst system.

In one embodiment, an alumoxane is contacted with a support material, preferably a porous support material, more preferably a inorganic oxide, and most preferably the support material is silica.

In an embodiment, the support material, preferably partially or totally dehydrated support material, preferably 200° C. to 600° C. dehydrated silica, is then contacted with an organoaluminum or alumoxane compound. Preferably in an embodiment where an organoaluminum compound is used, the activator is formed in situ on and in the support material as a result of the reaction of, for example, trimethylaluminum and water.

In yet another embodiment, Lewis base-containing supports are reacted with a Lewis acidic activator to form a support bonded Lewis acid compound. The Lewis base hydroxyl groups of silica are exemplary of metal/metalloid oxides where this method of bonding to a support occurs. This embodiment is described in U.S. patent application Ser. No. 09/191,922, filed Nov. 13, 1998, which is herein incorporated by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In a preferred embodiment, a supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range of from about 10 weight percent to about 70 weight percent, preferably in the range of from 20 weight percent to about 60 weight percent, more preferably in the range of from about 30 weight percent to about 50 weight percent, and most preferably in the range of from 30 weight percent to about 40 weight percent.

In a preferred embodiment, fumed silica is combined with methyl alumoxane and then spray dried to from a supported activator. Thereafter the supported methyl alumoxane is combined with a catalyst compound such as a bulky ligand metallocene catalyst compound in the process of this invention.

Spray Drying

In a particularly preferred embodiment, the catalyst compounds described above have been optionally combined with an activator and/or support material, and spray dried prior to being combined with the slurry diluent.

The catalyst compounds and/or the activators are preferably combined with a support material such as a particulate filler material and then spray dried, preferably to form a free flowing powder. Spray drying may be by any means known in the art. Please see EPA 0 668 295 B1, U.S. Pat. Nos. 5,674,795 and 5,672,669 which particularly describe spray drying of supported catalysts. In general one may spray dry the catalysts by placing the catalyst compound and the optional activator in solution, (allowing the catalyst compound and activator to react, if desired), adding a filler material such as silica or Cabosil™, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5–8 wt %. This formulation may sit as a slurry for as long as 30 minutes with mild stirring or manual shaking to keep it as a suspension before spray-drying. In one preferred embodiment, the makeup of the dried material is about 40–50 wt % activator, (preferably alumoxane), 50–60 $SiO_2$ and about ~2 wt % catalyst compound.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is co-sprayed. Lastly, another additive, such as 1-hexene in about 10 vol % can be present in the activator/filler mixture prior to the addition of the first metal catalyst compound.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

In another embodiment a solution of a bulky ligand metallocene type compound and optional activator can be combined with a different slurried spray dried catalyst compound and then introduced into a reactor.

The spray dried particles are generally fed into the polymerization reactor as a mineral oil slurry. Solids concentrations in oil are about 10–30 weight %, preferably 15–25 weight %. In some embodiments, the spray dried particles can be from less than about 10 micrometers in size up to about 25 micrometers, compared to conventional supported catalysts which are about 50 micrometers. In a preferred embodiment the support has an average particle size of 1 to 50 microns, preferably 10 to 40 microns, more preferably 10 to 25 microns.

In general the catalyst compounds and the supported activator are combined in ratios of about 1000:1 to about 0.5:1. In a preferred embodiment, the catalyst compounds and the supported activator are combined in a ratio of about 300:1 to about 1:1, preferably about 150:1 to about 1:1, for boranes, borates, aluminates, etc. the ratio is preferably about 1:1 to about 10:1.

Polymerization Process

The catalyst systems described above are suitable for use in any polymerization process, including solution, gas or slurry processes or a combination thereof. The polymerization process is preferably a gas or slurry phase process and more preferably utilizes a single reactor, and most preferably a single gas phase reactor. In a preferred embodiment, the catalyst system is preferably introduced into the reactor in a slurry.

In one embodiment, this invention is directed toward the polymerization or copolymerization reactions involving the polymerization of one or more monomers having from 2 to 30 carbon atoms, preferably 2 to 12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1,3-methyl-pentene-1,3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms. In an alternate embodiment, the geminally disubstituted olefins disclosed in WO 98/37109 may be polymerized or copolymerized using the invention herein described.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 75° C. to 1 10° C., and most preferably in the range of from about 85° C. to about 110° C. Altering the polymerization temperature can also be used as a tool to alter the final polymer product properties.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process. In one embodiment the ethylene partial pressure is about 220 to 240 psi (1517–1653 kPa). In another embodiment the molar ratio of hexene to ethylene ins the reactor is 0.03:1 to 0.08:1.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications -EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a solution, as a suspension, as an emulsion, as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

In a preferred embodiment of the invention, a slurry of an aluminum distearate in mineral oil is introduced into the reactor, separately or with the first and or second metal complex and/or with an activator, from the metal compounds and or the activators. More information on using aluminum stearate type additives may be found in U.S. application Ser. No. 09/113,261 filed Jul. 10, 1998, which is incorporated by reference herein.

In an embodiment, if the second metal compound and Group 15 metal compound of the catalyst system are introduced to the reactor in series, it is preferably that the second metal compound is added and/or activated first and that the Group 15 metal compound is added and/or activated second.

In another embodiment, the residence time of the catalyst composition is between about 3 to about 6 hours and preferably between about 3.5 and about 5 hours.

In an embodiment, the mole ratio of comonomer to ethylene, $C_x/C_2$, where $C_x$ is the amount of comonomer and $C_2$ is the amount of ethylene is between about 0.001 to 0.0100 and more preferably between about 0.002 to 0.008.

In a preferred embodiment, the hydrogen concentration in the reactor is about 100 to 5000 ppm, preferably 200 to 2000 ppm, more preferably 250 to 1900 ppm, more preferably 300 to 1800 ppm, and more preferably 350 to 1700 ppm, more preferably 400 to 1600 ppm, more preferably 500 to 1500 ppm, more preferably 500 to 1400 ppm, more preferably 500 to 1200 ppm, more preferably 600 to 1200 ppm, preferably 700 to 1100 ppm, and more preferably 800 to 1000 ppm.

Polymer of the Invention

The new polymers produced by the process of the present invention may be used in a wide variety of products and end use applications. Preferably the new polymers include polyethylene and polypropylene.

The polyolefins, particularly polyethylenes, produced by the present invention, preferably have a density of 0.89 to 0.97 g/cm$^3$. Preferably, polyethylenes having a density of 0.910 to 0.965 g/cm$^3$, more preferably 0.915 to 0.960 g/cm$^3$, and even more preferably 0.920 to 0.955 g/cm$^3$ can be produced. In some embodiments, a density of 0.915 to 0.940 g/cm$^3$ would be preferred, in other embodiments densities of 0.930 to 0.970 g/cm$^3$ are preferred.

In a preferred embodiment, the polyolefin recovered typically has a melt index I2 (as measured by ASTM D-1238, Condition E at 190° C.) of about 0.01 to 1000 dg/min or less. In a preferred embodiment, the polyolefin is ethylene homopolymer or copolymer. In a preferred embodiment for certain applications, such as films, pipes, molded articles and the like, a melt index of 10 dg/min or less is preferred. For some films and molded articles, a melt index of 1 dg/min or less is preferred. Polyethylene having a I2 between 0.01 and 10 dg/min is preferred.

In a preferred embodiment the polymer produced herein has an I21 (as measured by ASTM-D-1238-F, at 190° C.) of 0.1 to 10 dg/min, preferably 0.2 to 75 dg/min, preferably 2.0 dg/min or less, preferably 1.5 dg/min or less, preferably 1.2 dg/min or less, more preferably between 0.5 and 50 dg/min, more preferably between 0.6 and 20 dg/min.

In another embodiment, the polymers of the invention have a melt flow index "MIR" of $I_{21}/I_2$ of 10 or more for some applications and for other applications the MIR may be as high as 200.

In another embodiment the polymer has an I21 (as measured by ASTM 1238, condition F, at 190° C.)(sometimes referred to as Flow Index) of 2.0 dg/min or less, preferably 1.5 dg/min or less, preferably 1.2 dg/min or less, more preferably between 0.5 and 1.0 dg/min, more preferably between 0.6 and 0.8 dg/min and an $I_{21}/I_2$ of 80 or more, preferably 90 or more, preferably 100 or more, preferably 125 or more.

In another embodiment, the polymer of the invention is made into a pipe by methods known in the art.

The polyolefins of the invention can be made into films, molded articles (including pipes), sheets, wire and cable coating and the like. The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, BaSO$_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

In another embodiment, the polymer of the invention is made into a molded article by methods known in the art, for example, by blow molding and injection-stretch molding. For molded applications, the polymers of the invention have a I21 of from about 20 dg/min to about 50 dg/min and preferably from about 35 dg/min to about 45 dg/min.

In another embodiment, the polymers of the invention, including those described above, have an ash content less than 100 ppm, more preferably less than 75 ppm, and even more preferably less than 50 ppm is produced. In another embodiment, the ash contains negligibly small levels of titanium as measured by Inductively Coupled Plasma/Atomic Emission Spectroscopy (ICPAES) as is well known in the art.

EXAMPLES

In order to provide a better understanding of the present invention, including representative advantages thereof, the following examples are offered.

Catalyst C is Indenyl zirconium tris pivalate, a bulky ligand metallocene compound, also represented by formula VI, can be prepared by performing the following general reactions:

(1) $Zr(NEt_2)_4 + IndH \rightarrow IndZr(NEt_2)_3 + Et_2NH$ (2) $IndZr(NEt_2)_3 + 3 \ (CH_3)_3CCO_2H \rightarrow IndZr[O_2CC(CH_3)_3]_3 + Et_2NH$ Where Ind=indenyl and Et is ethyl.

MMAO is modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

SMAO is supported methyl alumoxane.

TNOAL is trin-octylaluminum.

Catalyst D is bisindenyl zirconium dichloride.

Preparation of Methyl Alumoxane Supported Activator (SMAO)

For a 1 Kg batch, 1158.43 grams of 30 wt % MAO (methyl alumoxane) in toluene (7.3 wt % Al) available from Albemarle and 2400 grams of extra toluene are charged into an 8 liter mix tank equipped with ribbon helical agitator. 984 grams of Davison 955–600 silica is added to MAO in toluene solution at ambient temperature. A 10° C. exotherm occurs from reaction of the MAO with the hydroxyl groups. The slurry mixes for 30 minutes at ambient temperature. Drying then occurs by heating the mix tank jacket to about 70° C. and reducing pressure to 0.00 mm/hg. As the slurry thickens the agitator rpm is reduced to minimum rotation, about 40–60 RPM. Then the rotation is slowly increased (to about 600 RPM) and the temperature is raised to 95° C. as the slurry turns to a dry powder. A nitrogen sweep (about 0.5 cc/min per gram of silica charged) can be used during the end of the drying step to help remove toluene from the silica pores. The material is typically held at 95° C. until toluene removal stops, and material temperature lines out near jacket temperature. The material temperature does not change for at least 30 minutes before the supported methylalumoxane (SMAO) is considered dry. Residual toluene is reduced to less than 2 wt % on the solids.

Procedure.

General. All manipulations were carried out in a glove box containing prepurified nitrogen or by using standard schlenk techniques. All solvents were purified by passing through a series of reduced copper chromite and activated alumina beds. Polymethylalumoxane (MAO), modified methylalumoxane (MMAO) and isobutylalumoxane (IBAO) were purchased from Akzo Nobel. Triisobutylaluminum (TIBA) and trimethylaluminum (TMA) were purchased from Aldrich Chemical. Indenylzirconium trispivalate was purchased from Boulder Scientific, Inc. Bis Indenylzirconium dichloride, $[(2,4,6\text{-Me}_3C_6H_2)NCH_2CH_2]_2$ $NHHfBz_2$ (Catalyst B) and $[(2,4,6\text{-Me}_3C_6H_2)NCH_2CH_2]_2NHZrBz_2$ (Catalyst A) were obtained from ExxonMobil Chemical Corp. Bis Indenylzirconium dichloride was purified by soxhlet extraction with methylene chloride under an inert atmosphere and protected from light prior to use. TNOAL was used as received from Akzo Nobel.

Preparation of 1M alkylaluminum stock solutions. To make a 1 M solution of tri-n-octylaluminum (TNOAL), 2.9ml of a 16.96 M solution of TNOAL in pentane (61.0 wt. % Al, r=0.75) was added to pentane (47.1 ml). To prepare a 1 M solution of triisobutylaluminum (TIBA), 12.6 ml of 3.96 M TIBA (r=0.786, FW =198.33) was added to pentane (37.4 ml). To prepare a 1 M solution of tri-n-octyaluminoxane (TNOALO), 7.9 mL of a 6.30 M TNOALO in pentane (20 wt. % Al, =0.85) solution was added to pentane (42.1 ml). Commercially available isobutylaluminoxane (IBAO) was obtained as a 0.95 M solution and was used as is.

General Procedure for Slurry-Phase Ethylene Polymerization Experiments. The following are procedures currently in use for testing various catalysts in the slurry phase. The basic reactor system consists of a one-liter stainless steel reactor vessel. A purge/evacuation cycle is initiated and the reactor is heated to 95° C. with nitrogen flowing through the reactor at 500 sccm. Once the reactor has reached 95° C., three evacuation-refill cycles are carried out with dry nitrogen. After these cycles, the reactor is cooled to 60° C. under a dry nitrogen purge at 200 sccm. When the reactor has reached a temperature below 60° C., 600 mL of hexane is charged to the reactor through a series of purification beds containing a reduced copper chromite catalyst, 13× molecular sieves and alumina. Once the hexane charge is completed, 1-hexene (43 mL, dried over 13× molecular sieves) and scavenging solution are added consecutively to the reactor through a reactor port. The scavenging solutions used for these experiments were modified methyl alumoxane (MMAO, 250 equivalents, Type 3A, 1.84 M) and tri-isobutyl aluminum (TIBA, 200 equivalents). The reactor is then heated to 55° C. for at least 10 minutes and is subsequently pressurized with ethylene to the set ethylene partial pressure (85–130 psi). The catalyst solution is then charged to the reactor via a pressurized bomb. Polymerization experiments are carried out for periods typically in the 30–40 minute range. Polymerization activities are determined from the weight of dried polymer recovered from slurry-phase experiments.

Comparative Procedure for Catalyst Activation by SMAO. The following is a representative example for the activation of a catalyst by the a comparative procedure. Experiments involving bis indenylzirconium dichloride and indenylzirconium tris pivalate were carried out analogously.

Slurry-Phase Ethylene-1-Hexene Co-polymerization by Catalyst A SMAO in 15-wt. % Kaydol Oil. A catalyst slurry in mineral oil was prepared by suspending solid Catalyst A (10 mg, 16.3 μmol) and SMAO (0.47 g, 130 equivalents) in degassed kaydol oil (3.21 g). The catalyst mixture was agitated by rolling for 19 hours. A 0.50 g aliquot (2.30 μmol) was loaded into a bomb and injected into the 1-liter autoclave reactor via the pressurized bomb.

Procedure for Catalyst Activation by Alumoxane Pretreatment and SMAO Deposition. The following is a representative example for the activation of a catalyst by the alumoxane pretreatment procedure. Experiments involving bis indenylzirconium dichloride and indenylzirconium tris pivalate were carried out analogously.

Slurry-Phase Ethylene-1-Hexene Co-polymerization by Alumoxane-Presolubilized Catalyst A-SMAO. A catalyst solution was prepared by dissolving solid Catalyst A (10 milligrams, 16.3 μmol) in a mixture of isobutylalumoxane (0.85 mL, 50 equivalents, 0.95 M) and degassed kaydol oil (1.0 mL). Solid SMAO (103 mg, 120 equivalents) was weighed into a centrifuge vial. The catalyst mixture was stirred for 20 minutes. A 0.20 mL aliquot (1.75 μmol) of the IBAO-Catalyst A solution was placed in the centrifuge vial with the SMAO. The catalyst slurry was centrifuged for 2.5 minutes at 7500 rpm. The supernatant was decanted off the solid, and the solid was slurried in hexane. The catalyst-hexane slurry was placed into a bomb and injected into the 1-liter autoclave reactor via the pressurized bomb.

Example 1

The effect of contact time was studied on an SMAO-Catalyst A system without the addition of an aluminum alkyl or alumoxane. Except for not pre treating with an aluminum alkyl or an alumoxane the polymerizations were run according to the procedure above. The Al/Zr ratio for all polymerizations was 130:1. The data are reported in Table 1.

TABLE 1

| Contact Time (h) | Activity* |
|---|---|
| 1 | 2019 |
| 4 | 6201 |
| 24 | 8076 |
| 48 | 9816 |
| 118 | 8941 |

*g PE (mmol Zr)$^{-1}$ (100 psi)$^{-1}$ h$^{-1}$

Example 2

The effect of varying the Al/Zr ratio was studied on the SMAO-Catalyst A system without the addition of an aluminum alkyl or alumoxane. Except for not pre treating with an aluminum alkyl or an alumoxane, allowing a contact time of 18 hours between the Catalyst A and the SMAO, and introducing a scavenger into the reactor prior to the introduction of the Catalyst A-SMAO combination into the reactor, the polymerizations were run according to the procedure above. The data are reported in Table 2.

TABLE 2

| Scavenger | Al/Zr | Activity |
|---|---|---|
| TIBA | 117 | 11866 |
| TIBA | 130 | 19226 |
| TIBA | 120 | 17246 |
| TIBA | 200 | 23553 |
| TMA | 200 | 15352 |
| TNOAL | 200 | 21125 |
| TIBA | 300 | 28802 |
| TIBA | 500 | 19135 |

*g PE (mmol Zr)$^{-1}$ (100 psi)$^{-1}$ h$^{-1}$

Example 3

The effect of alumoxane choice in polymerizations with Catalyst A without the addition of an aluminum alkyl or alumoxane was studied. Except for not pre treating with an aluminum alkyl or an alumoxane, and using solution MAO or solution MMAO (as opposed to SMAO), the polymerizations were run according to the procedure above. The Al:Zr ratio was 200:1 The data are reported in Table 3.

TABLE 3

| Cocatalyst | Activity |
|---|---|
| MAO | 31074 |
| MAO | 30688 |
| MMAO | 107118 |
| MMAO | 70494 |
| MMAO | 78760 |

Example 4

The effect of alumoxane pretreatment on SMAO-cocatalyzed polymerization was studied on the SMAO-Catalyst A system in polymerizations according to the procedure above. Catalyst A was dissolved in a minimum amount of pre treatment agent and SMAO was then added allowing 5 minutes of contact time before the supernatant was decanted away and the solid catalyst was injected into the reactor. MMAO was added as the cocatalyst and the Al/Zr ratio of the cocatalyst to the SMAO containing Catalyst A was 200:1. The data are reported in Table 4.

TABLE 4

| Pretreatment Agent | Al/Zr ratio of pretreatment agent to Catalyst A | Activity |
|---|---|---|
| — | 120 | 14084 |
| MMAO | 120 | 32413 |
| MMAO | 200 | 78964 |
| MMAO | 500 | 69954 |
| IBAO | 200 | 39640 |
| IBAO | 300 | 58382 |
| MAO | 50 | 20292 |
| MAO | 300 | 30222 |
| — | 0 | 50977 |
| — | 120 | 18919 |

Example 5

The effect of pretreament with an alumoxane, Al/Zr ratio and contact time on Catalyst A activity was studied on the SMAO-Catalyst A system in polymerizations according to the procedure above. The data are reported in Table 5.

TABLE 5

| pretreatment alumoxane | Al/Zr ratio of pretreatment alumoxane to Catalyst A | contact time(min) between pretreatment alumoxane and Catalyst A | Al/Zr ratio of SMAO to Catlyst A | contact time (min) between Catalyst A after pretreatment and SMAO | Activity |
|---|---|---|---|---|---|
| MAO | 100 | 20 | 300 | 7 | 29784 |
| MMAO | 200 | 25 | 460 | 5 | 69954 |
| MMAO | 200 | 10 | 460 | 5760 | 12282 |
| MMAO | 86 | 1325 | 130 | 1325 | 14038 |
| IBAO | 10 | 1200 | 50 | 10 | 13996 |
| MMAO | 100 | 1230 | 50 | 275 | 14226 |
| IBAO | 50 | 75 | 50 | 60 | 17424 |
| IBAO | 50 | 75 | 50 | 240 | 12574 |
| IBAO | 50 | 1389 | 50 | 60 | 17440 |
| IBAO | 50 | 75 | 50 | 1440 | 17453 |
| IBAO | 50 | 60 | 20 | 80 | 9246 |
| IBAO | 50 | 1230 | 50 | 1230 | 2972 |
| MMAO | 100 | 30 | 300 | 5 | 64602 |
| MMAO | 100 | 30 | 300 | 5 | 86536 |
| IBAO | 120 | 60 | 80 | 60 | 16741 |

TABLE 5-continued

| pretreatment alumoxane | Al/Zr ratio of pretreatment alumoxane to Catalyst A | contact time(min) between pretreatment alumoxane and Catalyst A | Al/Zr ratio of SMAO to Catlyst A | contact time (min) between Catalyst A after pretreatment and SMAO | Activity |
|---|---|---|---|---|---|
| IBAO | 50 | 60 | 80 | 60 | 20425 |
| IBAO | 100 | 60 | 50 | 80 | 11834 |
| IBAO | 75 | 60 | 60 | 60 | 15775 |
| IBAO | 100 | 65 | 150 | 75 | 29939 |
| IBAO | 50 | 60 | 100 | 60 | 22962 |
| IBAO | 50 | 60 | 60 | 90 | 17705 |

Example 6

The effect of the contact time between SMAO and Catalyst A at differing AL/Zr ratios was studied. Catalyst A was placed in toluene and was not contacted with a pretreatment agent otherwise the polymerizations were according to the procedure above. The data are reported in Table 6.

TABLE 6

| Zr Loading (micromoles/g SMAO) | Al/Zr ratio of SMAO to Catlayt A | Contact Time (min) between SMAO and Catalyst A | g PE produced | Activity (Zr) | Activity (Al) | g/g productivity |
|---|---|---|---|---|---|---|
| 90 | 50 | 5 | 28.3 | 16246 | 325 | 1274 |
| 90 | 50 | 60 | 32.2 | 18485 | 370 | 1449 |
| 90 | 50 | 1440 | 26.8 | 15385 | 308 | 1206 |
| 37.5 | 120 | 5 | 33.1 | 19001 | 158 | 621 |
| 37.5 | 120 | 60 | 32.6 | 18714 | 156 | 611 |
| 37.5 | 120 | 1440 | 32.5 | 18657 | 155 | 609 |
| 22.5 | 200 | 5 | 31.6 | 18117 | 91 | 356 |
| 22.5 | 200 | 60 | 31.1 | 17876 | 89 | 350 |
| 22.5 | 200 | 1440 | 35.7 | 20494 | 102 | 402 |
| 9 | 500 | 5 | 54.5 | 31286 | 63 | 245 |
| 9 | 500 | 60 | 44.3 | 25408 | 51 | 199 |
| 9 | 500 | 1440 | 34.8 | 19977 | 40 | 157 |

Example 7

The effect of alumoxane levels in the SMAO and contact times between the SMAO and indenyl zirconium tris pivalate (Catalyst A) pretreated with MMAO were studied. Catalyst A in hexane solution was contacted with SMAO for 20 minutes at an Al/Zr ratio of 300:1. The supernatant was decanted and the solid was screened for polymerization activity according to the general procedure above. The catalyst was found to be completely inactive. The same catalyst was pretreated with MMAO and screened for polymerization activity according to the general procedure above. The data are reported in Table 7.

TABLE 7

| Al/Zr ratio of MMAO to Catalyst C | Al/Zr ratio of SMAO to Catalyst C | Contact time (min) between SMAO and Catalyst C | Activity |
|---|---|---|---|
| 0 | 300 | 20 | 0 |
| 250 | 250 | 20 | 82824 |
| 250 | 250 | 240 | 3922 |
| 500 | 0 | 20 | 38471 |

Example 8

The effect of Al/Zr ratio of the SMAO to Catalyst C on the activity of Catalyst C pretreated with MMAO in polymerizations according to the procedure above were studied. The data are reported in Table 8.

TABLE 8

| μmol catalyst C | μmol MMAO (150 equiv) | Al/Zr ratio of SMAO to Catalyst C | activity |
|---|---|---|---|
| 19.6 | 2940 | 15 | 3001 |
| 2 | 300 | 150 | 30824 |
| 1 | 150 | 300 | 28588 |
| 0.5 | 75 | 600 | 0 |

Example 9

The effect of contact time and pretreatment on SMAO-cocatalyzed bisindenyl zirconium dichloride (Catalyst D) activity in polymerizations according to the procedure above was studied. The data are reported in Table 9.

TABLE 9

| Pretreatment Agent (equiv) | Al/Zr ratio of SMAO to Catalyst D | Contact time(min) between SMAO and Catalyst D | Activity |
|---|---|---|---|
| none | 150 | 10 min | 76941 |
| TMA (100) | 150 | 4.5 h | 57353 |
| TMA (100) | 150 | 47 h | 63747 |

Example 10

All operations in Experiments 10 and 11 were carried out in an atmosphere of dry, $O_2$-free $N_2$ in a Vacuum Atmospheres glovebox. Toluene was prepared for use by passing it through a bed of Q5 deoxygenation catalyst followed by 13× molecular sieves. Kaydol mineral oil was prepared by sparging it with dry $N_2$ gas for several hours before use. Catalyst C (bis-(1-methyl-3-butylcyclopentadienyl) zirconium dichloride combined with modified MAO (170:1 Al/Zr ratio) and a calcined porous silica support) used in this example was prepared for polymerization by slurrying it in Kaydol at a 15 wt. % solids content. The iminophenoxide ligand used, N-iso-butyl-2-tert-butyl salicylimine, was prepared by mixing an excess of iso-butylamine with 2-tert-butylsalicylaldehyde, allowing the reaction to proceed at room temperature for 1 hour, then removing the excess iso-butylamine and water formed under vacuum.

BBF values were measured by calculating the ratio of the IR absorbance at 1377 cm-1 and 4166 cm-1, and comparing this ratio with a calibration curve made for a number of polymers of varying BBF contents. The SMAO (supported methyl alumoxane) was obtained from Witco.

A polymerization using an iminophenoxide catalyst (bis (N-iso-butyl-3-t-butylsalicyclimino)zirconium (IV)dibenzyl) with a supported metallocene (Catalyst C) using MMAO-pre-activation was performed as follows.

A stock solution of iminophenoxide ligand (214.5 g, 793.0 µmol) and $Zr(CH_2Ph)_4$ (191.2 mg, 419 µmol) in dry, degassed toluene (38 mL) was prepared. The resulting red solution was stirred at room temperature for 45 min. Then, an aliquot of this red iminophenoxide catalyst solution (0.19 mL, 2.0 µmol Zr) was treated with a solution of modified MAO in heptane (0.66 mL, 1.2 mmol), and the resulting yellow solution was stirred for 5 minutes. A stock slurry of the supported metallocene Catalyst C in kaydol oil (912.5 mg, 40.02 µmol Zr, 20 mL kaydol oil) was prepared. An aliquot of this slurry (2 mL, 6 µmol) was treated with the previous yellow solution. The resulting slurry was stirred for five minutes. At the end of this contact time, an aliquot of the resulting slurry of red solid in clear, colorless mineral oil (0.50 mL, 0.35 iminophenoxide catalyst, 0.70 µmol metallocene) was added to a small Hoke bomb. The bomb was connected to the reactor, and the catalyst slurry was pushed into the reactor with ethylene pressure and a 10 mL hexane wash. The reactor was then sealed and pressurized to 135 psi with ethylene gas, and the temperature was adjusted to 85° C. The polymerization was allowed to proceed for 40 minutes, at which time the reactor was cooled and vented. The polymer was harvested from the polymerization mixture by suction filtration, then dried under vacuum overnight. Yield: 55.6 g of fine powdery polymer having a butyl branching frequency (BBF, as determined by IR spectroscopy) of 2.1 branches per 1000 C atoms.

Example 11 (Comparative)

A similar polymerization, except using 3 times as much of the supported metallocene and iminophenoxide catalysts (2.0 µmol metallocene, 1.0 µmol iminophenoxide catalyst), but without the addition of modified MAO to the iminophenoxide catalyst solution solution, was carried out according to the procedure in Experiment 10. This led to formation of 21.8 g of powdery polymer having a BBF of 8.8 branches per 1000 C atoms.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. It is within the scope of this invention to use two or more Group 15 containing metal compounds with one or more bulky ligand metallocene catalyst system and/or one or more conventional type catalyst system. Accordingly it is not intended that the invention be limited thereby.

We claim:

1. A method of supporting one or more catalyst compounds comprising contacting at least one catalyst compound and at least one supported activator; wherein the catalyst compound has been combined with a pretreatment agent selected from the group consisting of an aluminum alkyl and an alumoxane prior to contacting with the at least one supported activator;

wherein the catalyst compound is represented by the formula:

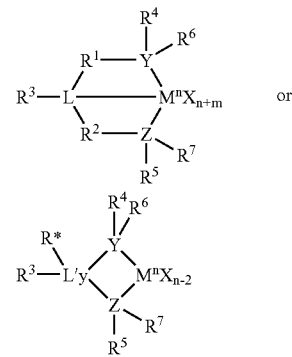

wherein
M is a Group 3 to 14 metal,
each X is independently a leaving group
y is 0 or 1,
n is the oxidation state of M,
m is the formal charge of the YZL or the YZL' ligand,
L is a Group 15 or 16 element,
L' is a Group 15 or 16 element or Group 14 containing group,
Y is a Group 15 element,
Z is a Group 15 element,
$R^1$ and $R^2$ are independently a $C_1$ to $C_{20}$ hydrocarbon group, a heteroatom containing group having up to twenty carbon atoms, silicon, germanium, tin, lead, or phosphorus,
$R^3$ is absent or a hydrocarbon group, hydrogen, a halogen, a heteroatom containing group,
$R^4$ and $R^5$ are independently an alkyl group, an aryl group, substituted aryl group, a cyclic alkyl group, a substituted cyclic alkyl group, a cyclic arylailcyl group, a substituted cyclic arylalkyl group or multiple ring system,
$R^{10}$ and $R^2$ may be interconnected to each other, and/or $R^4$ and $R^5$ may be interconnected to each other,
$R^6$ and $R^7$ are independently absent or hydrogen, an alkyl group, halogen, heteroatom or a hydrocarbyl group,
R is absent, or is hydrogen, a Group 14 atom containing group, a halogen, a heteroatom containing group
wherein the supported activator comprises an alumoxane and a support selected from the group consisting of silica, fumed silica, alumina, silica-alumina, magnesia, titania, zirconia, magnesium chloride, and wherein said supported activator is present at a ratio of 10.000:1 to 10:1 of the metal of the supported activator to the metal of the catalyst compound.

2. The method of claim 1 wherein the pretreatment agent is an aluminum alkyl represented by the formula $Al(R)_3$, where each R group is independently a $C_1$ to $C_{40}$ alkyl group.

3. The method of claim 1 wherein the pretreatment agent comprises an aluminum alkyl represented by the formula $Al(R)_3$, where each R group is independently selected from the group consisting of methyl, ethyl, propyl, isopropyl, butyl, isobutyl cyclobutyl, pentyl, cyclopentyl, hexyl, isohexyl, cyclohexyl and the like.

4. The method of claim 1 wherein the supported activator comprises: 1) silica and or fumed silica; and 2) an alumoxane.

5. The method of claim 1 wherein the supported activator comprises alumoxane and silica and or fumed silica and the pretreatment agent is selected from the group consisting of tri-isobutyl aluminum, trimethyl aluminum, methyl alumoxane, butyl alumoxane, isobutyl alumoxane, octyl alumoxane and mixtures thereof.

* * * * *